(12) United States Patent
Monaghan et al.

(10) Patent No.: US 11,562,464 B1
(45) Date of Patent: Jan. 24, 2023

(54) SYSTEMS AND METHODS FOR IMAGE POSTPROCESSING VIA VIEWPORT DEMOSAICING

(71) Applicant: Illuscio, Inc., Culver City, CA (US)

(72) Inventors: Robert Monaghan, Ventura, CA (US); Kevan Spencer Barsky, Santa Monica, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 17/936,665

(22) Filed: Sep. 29, 2022

(51) Int. Cl.
| | | |
|---|---|---|
| G06K 9/00 | (2022.01) | |
| G06T 3/40 | (2006.01) | |
| G06T 7/90 | (2017.01) | |
| G06V 10/25 | (2022.01) | |
| G06V 10/74 | (2022.01) | |
| G06V 10/764 | (2022.01) | |
| G06V 10/56 | (2022.01) | |

(52) U.S. Cl.
CPC .............. *G06T 3/4015* (2013.01); *G06T 7/90* (2017.01); *G06V 10/25* (2022.01); *G06V 10/56* (2022.01); *G06V 10/761* (2022.01); *G06V 10/764* (2022.01); *G06T 2207/10024* (2013.01); *G06T 2207/30168* (2013.01)

(58) Field of Classification Search
CPC ....... G06T 3/40; G06T 3/4007; G06T 3/4015; G06T 3/4053; G06T 3/4069; G06T 7/90; G06T 2207/10024; G06T 2207/30168; G06V 10/25; G06V 10/56; G06V 10/761; G06V 10/764
See application file for complete search history.

(56) References Cited

U.S. PATENT DOCUMENTS

| | | | | |
|---|---|---|---|---|
| 2008/0144952 A1* | 6/2008 | Chen | ...................... | H04N 19/93 375/E7.076 |
| 2010/0194862 A1* | 8/2010 | Givon | .................. | H04N 13/218 348/344 |
| 2012/0147205 A1* | 6/2012 | Lelescu | ................ | H04N 13/111 348/E5.024 |
| 2014/0139642 A1* | 5/2014 | Ni | ........................... | H04N 9/09 382/162 |

* cited by examiner

*Primary Examiner* — Duy M Dang
(74) *Attorney, Agent, or Firm* — Ansari Katiraei LLP; Arman Katiraei; Sadig Ansari

(57) ABSTRACT

An image postprocessor enhances the quality and detail of a rendered image by applying a photosite demosaicing technique directly to the pixels stored in the viewport of the rendered image. The image postprocessor detects a first subset of the viewport pixels having color values that deviate by more than a threshold amount from color values of a neighboring second subset of the viewport pixels. The image postprocessor maps the viewport pixels to a set of emulated photosites based on a position of each pixel in the viewport, and demosaics and/or interpolates the color values associated with a subset of the emulated photosites in order to generate new pixels for the gap. The image postprocessor replaces the first subset of pixels in the viewport with the new pixels, and presents a second visualization based on the modified pixels of the viewport.

19 Claims, 8 Drawing Sheets

SYSTEMS AND METHODS FOR IMAGE POSTPROCESSING VIA VIEWPORT DEMOSAICING

BACKGROUND

Digital images are rendered as a set of pixels. The color values associated with each pixel may be mapped or derived from the color values that are captured by different photosites of an imaging device sensor.

Gaps, that contain no pixels or pixels with inaccurate, incorrect, or corrupted color values, may emerge in a rendered image when the light reflecting onto the photosites is distorted, blocked, or interfered with. Gaps may also occur when there are insufficient pixels to render a part of the image onscreen. For instance, a user may zoom into an image such that the density of pixels for the zoomed part of the image is less than the display pixel density, or the user may change the viewport, frustum, or virtual camera to a part of the image that was captured with less visual data than other parts. Accordingly, when pixels are incorrectly captured for a part of an image or the number of pixels to be rendered onscreen exceeds the visual data that is encoded for the part of the image that is to be rendered onscreen, the image quality degrades as more gaps are introduced in the rendered image.

DETAILED DESCRIPTION OF PREFERRED EMBODIMENTS

The following detailed description refers to the accompanying drawings. The same reference numbers in different drawings may identify the same or similar elements.

Provided are systems and methods for postprocessing a rendered image by preforming a demosaicing or debayering of the pixels forming the viewport. The systems and methods include generating the viewport by rendering the image data or pixels that fall within a defined field-of-view, detecting gaps within the rendered pixels of the image that make up the viewport, mapping the rendered pixels based on their respective positions within the viewport to emulate a set of photosites of an emulated imaging sensor, and filling in or replacing the detected gaps in the viewport with pixels that are dynamically generated from demosaicing the color values from the emulated photosites represented by the pixels that neighbor or surround each gap.

In some embodiments, a Graphics Processing Unit ("GPU") and/or other hardware processor processes the image data that is entered into a rendering pipeline in order generate the viewport. The rendered pixels that form the viewport and create a visualization of the image data are stored in a memory buffer. An image postprocessor, that implements the systems and methods of some embodiments, accesses the memory buffer, detects a gap formed by a set pixels in the memory buffer with color values that deviate from those of neighboring pixels by more than a threshold amount, generates an emulated imaging sensor from the pixels in the memory buffer, performs the demosaicing based on the color values associated with pixels surrounding the detected gap, and modifies the memory buffer to add pixels or change pixel color values at each detected gap based on the demosaicing results. In this manner, the postprocessing performed by the image postprocessor refines and improves the quality of the initially rendered image by directly modifying one or more of the pixels in the memory buffer without modifying the stored image data or the image file, without rendering the image data anew or regenerating each and every pixel of the viewport, and without modifying the rendering pipeline that generates the initially rendered image.

Figure 1:
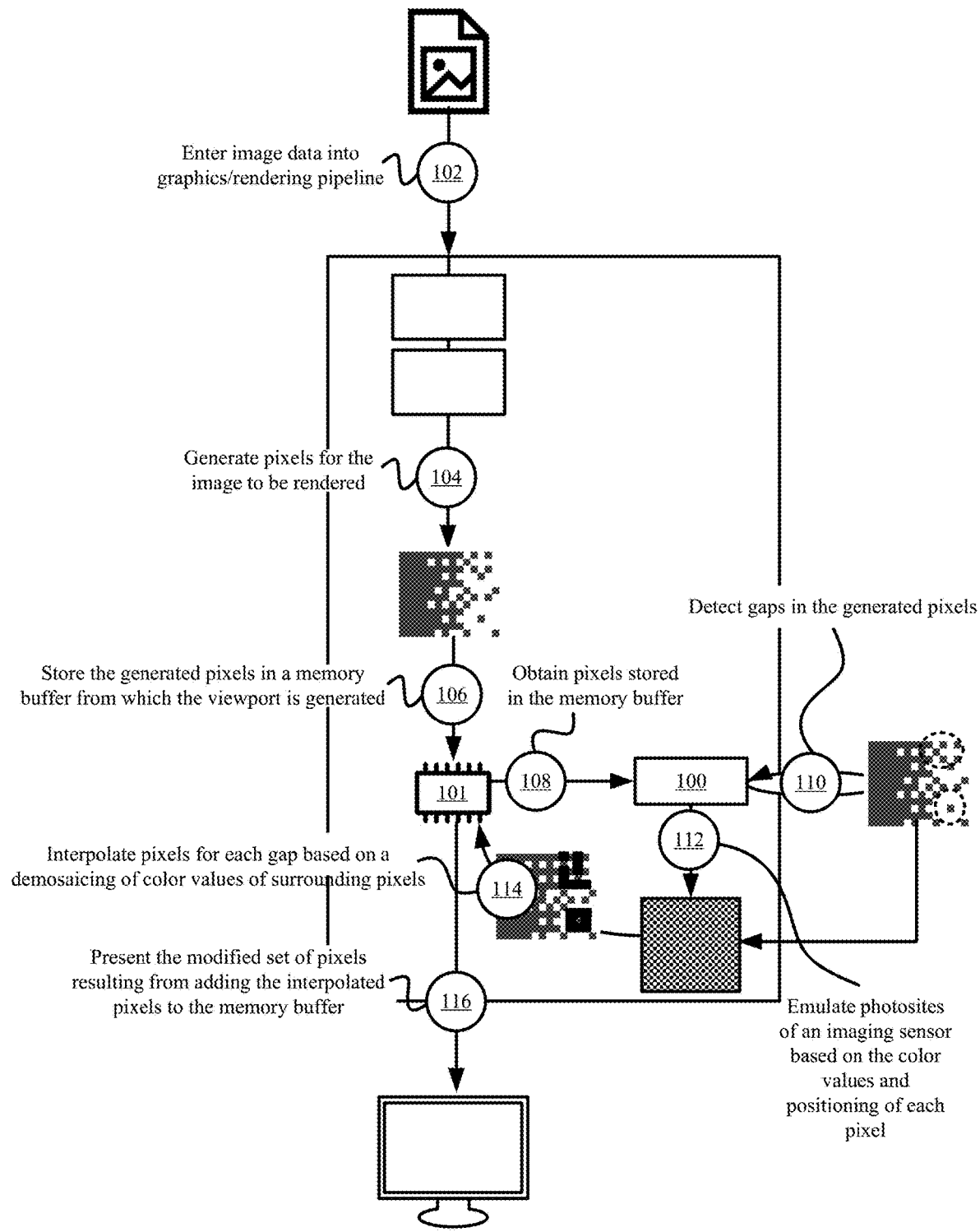
FIG. 1 illustrates an example of postprocessing a rendered image by demosaicing the viewport in accordance with some embodiments presented herein.

FIG. 1 illustrates an example of postprocessing a rendered image by demosaicing the viewport in accordance with some embodiments presented herein. As shown in FIG. 1, an image file or image data is entered (at 102) into a graphics and/or rendering pipeline. The image file may include visual data captured by an imaging sensor. The visual data corresponds to color values (e.g., red, green, blue, etc.) and/or other spectral data (e.g., intensity values in other visible or non-visible bands of the electromagnetic spectrum) captured for different parts of the image by the imaging sensor. The image file may be a two-dimensional ("2D") or a three-dimensional ("3D") image of an object, scene, or environment. For instance, a point cloud represents a 3D image file that may be entered (at 102) into the rendering pipeline.

The rendering pipeline is executed using one or more hardware processors (e.g., GPUs). Execution of the rendering pipeline converts the image data into a set of pixels that may be presented onscreen or on a display device. Specifically, the rendering pipeline processes the image data within the image file, generates (at 104) a set of pixels for the image that is to be presented, and stores (at 106) the set of pixels to memory buffer 101 from which the viewport is generated.

In some embodiments, the viewport is generated based on a subset of the image data from the image file that falls within a defined visible area or field-of-view. For instance, the field-of-view may be defined by the positioning of a virtual camera relative to the image data or a 2D or 3D space that contains the image data.

In some embodiments, generating (at 104) the set of pixels includes selecting and/or presenting some or all the pixels from the image file without modification. In some other embodiments, generating (at 104) the set of pixels includes applying one or more effects or modifications (e.g., lighting effects, transformations, textures, etc.) to the image data, and/or converting the image data from raw mosaic values or another format into the set of pixels that are stored in memory buffer 101.

In some embodiments, the rendering pipeline also generates a first visualization on a display (e.g., a first image that is presented onscreen) based on the set of pixels in memory buffer 101, and image postprocessor 100 performs the postprocessing to refine and improve the first visualization. In some other embodiments, image postprocessor 100 performs the postprocessing on the pixels in memory buffer 101 before presenting any images onscreen.

To perform the postprocessing, image postprocessor 100 obtains (at 108) the set of pixels that are stored in memory buffer 101. Obtaining (at 108) the set of pixels may include reading the set of pixels from memory buffer 101 or directly accessing the set of pixels within memory buffer 101.

Image postprocessor 100 analyzes (at 110) the set of pixels to detect one or more gaps. A gap includes undefined or missing pixels for parts of the viewport, pixels that have invalid values, and/or pixels that have values that deviate by more than a threshold amount from neighboring pixels. For instance, an invalid pixel includes a pixel that is defined with pure black color values or pure white color values and that is surrounded by pixels that do not have pure black color values or pure white color values. An invalid pixel also includes a pixel with red, green, blue ("RGB") and/or other color values that deviate by more than a threshold amount from RGB color values of surrounding pixels. In some embodiments, gaps appear as a user manipulates or moves within an image. For instance, the user may zoom into a particular region of the rendered image. The particular region becomes enlarged, and the pixels representing the particular region are spaced further apart from one another as a result of the zoom effect. A gap occurs when neighboring pixels become separated by more than a threshold distance.

Image postprocessor 100 emulates (at 112) the photosites of an imaging sensor based on the positioning of each pixel of the set of pixels in the viewport and the color values associated with each pixel. For instance, image postprocessor 100 maps the color values associated with a different pixel in the viewport to color values that are captured by an emulated photosite at a position in an emulated imaging sensor that corresponds to the position of the pixel relative to other pixels in the viewport. In emulating (at 112) the photosites, image postprocessor 100 identifies the subset of pixels and/or emulated photosites that neighbor and/or surround each detected gap.

Image postprocessor 100 interpolates (at 114) one or more new pixels with one or more color values for each detected gap based on the color values of the subset of pixels that neighbor or surround each gap. Image postprocessor 100 interpolates (at 114) the one or more new pixels for each gap according to a demosaicing or debayering technique that is performed using the color values of the surrounding subset of pixels for each gap.

The interpolated (at 114) pixels are added to memory buffer 101 and used to replace or modify parts of the originally rendered viewport where the gaps existed. Adding the interpolated (at 114) pixels to memory buffer 101 does not change the image data of the image file since memory buffer 101 contains the set of pixels that are rendered from the image data rather than the image data itself. In other words, the changes are made directly to the viewport or the first visualization that is generated from rendering the original image data rather than to the encoded image.

Image postprocessor 100 presents (at 116) the modified set of pixels resulting from adding the interpolated (at 114) pixels to memory buffer 101 on a display. Presenting (at 116) the modified set of pixels includes generating a second visualization based on the pixels that were originally rendered for the viewport with rendered or missing pixels at the detected gaps being replaced with the one or more new pixels that were generated for those gaps via the demosaicing interpolation. Consequently, image postprocessor 100 improves the quality and color consistency of the image that is generated from the image data of the image file by automatically replacing gaps in the resulting image with pixels that are generated based on a demosaicing of the color values from the rendered pixels surrounding each gap.

Figure 2:
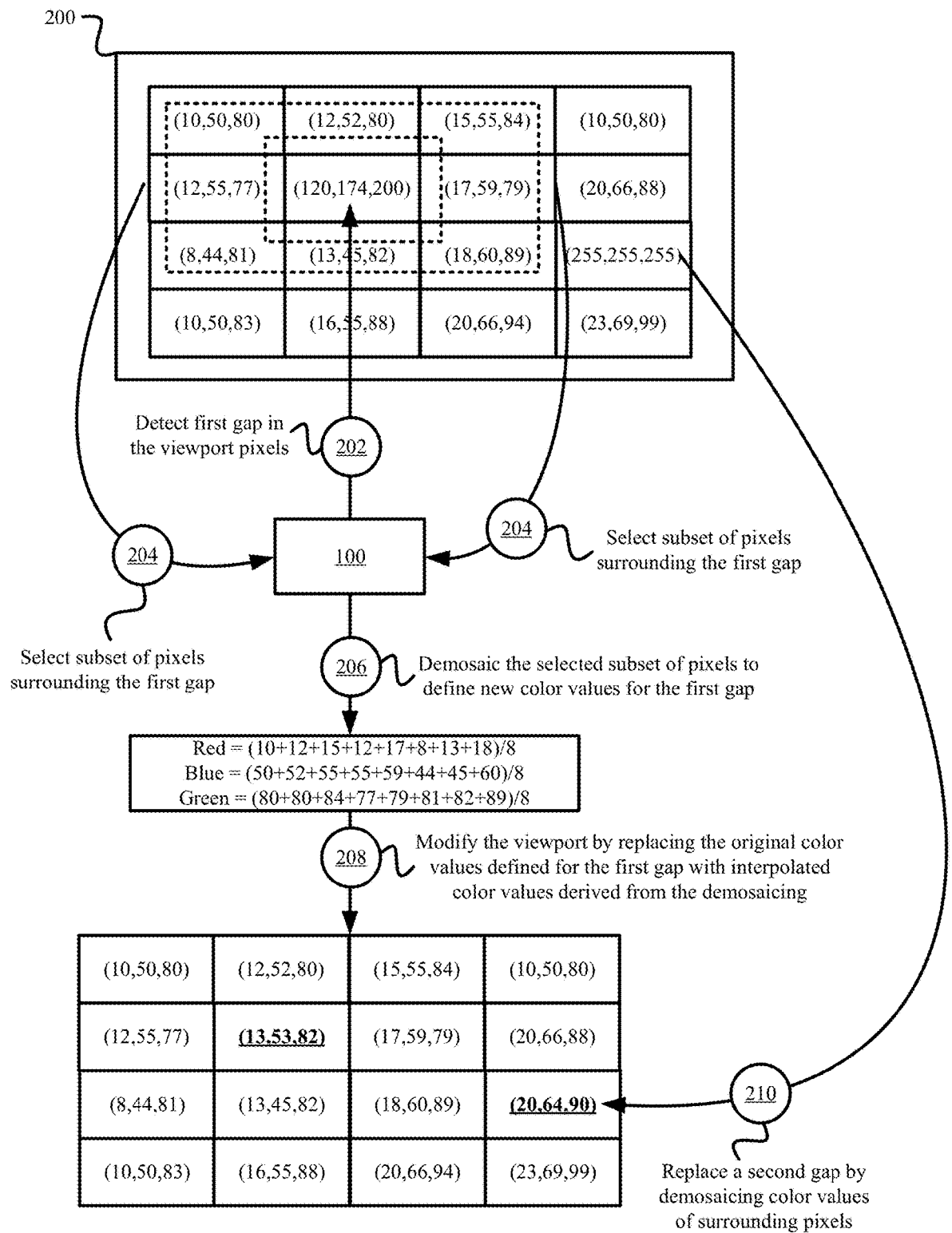
FIG. 2 illustrates an example that uses pixels generated for the viewport as emulated photosites of an emulated imaging sensor in order to interpolate pixels for gaps in the viewport via a demosaicing of the surrounding pixels in accordance with some embodiments presented herein.

FIG. 2 illustrates an example that uses pixels generated for the viewport as emulated photosites of an emulated imaging sensor in order to interpolate pixels for gaps in the viewport via a demosaicing of the surrounding pixels in accordance with some embodiments presented herein. As shown in FIG. 2, viewport 200 is formed by a 4×4 grid of pixels. Each pixel of viewport 200 is defined with RGB color values that range between 0-255. The RGB color values may be generated based on raw mosaic values or intensity values captured for the same RGB spectral bands of the electromagnetic spectrum or are derived based on converted intensity values captures for different visible, infrared, ultraviolet, microwave, and/or other non-visible bands of the electromagnetic spectrum.

Image postprocessor 100 detects (at 202) a first gap at a center of a first subset of the viewport pixels. Image postprocessor 100 detects the first gap based on the color values at the center of the first subset of the viewport pixels differing from the color values of the surrounding first subset of viewport pixels by more than a threshold.

Image postprocessor 100 selects (at 204) the first subset of viewport pixels that surround the first gap and that have consistent or similar color values with one another. The first subset of viewport pixels may include one or more pixels at each side of the first gap. For instance, image postprocessor 100 selects (at 204) one or two pixels above, below, to the right, and to the left of the first gap in viewport 200.

Image postprocessor 100 performs (at 206) a demosaicing of the selected first subset of viewport pixels that surround the first gap. Performing (at 206) the demosaicing includes obtaining the color values from each pixel of the selected first subset of viewport pixels, and deriving color values for one or more interpolated pixels that are generated to fill the first gap based on the color values of the selected first subset of viewport pixels. In some embodiments, image postprocessor 100 defines the color values for the interpolated pixels based on the average RGB color values of the first subset of viewport pixels. In some other embodiments, image postprocessor 100 defines the color values for the interpolated pixels to match the most common color values of the pixels from the first subset of viewport pixels (e.g., the RGB values that are defined for the greatest number of pixels from the first subset of viewport pixels). In still some other embodiments, the demosaicing includes defining the color values for the interpolated pixels by taking different color values from different pixels of the selected first subset of viewport pixels.

Image postprocessor 100 modifies (at 208) viewport 200 by replacing the original color values defined for the first gap with color values of interpolated pixels that are derived from performing (at 206) the demosaicing. Image postprocessor 100 replaces (at 210) a second gap in viewport 200 with invalid color values that are indicative of a failed photosite based on a demosaicing of the color values of a second subset of data points that surround the second gap.

Figure 3:
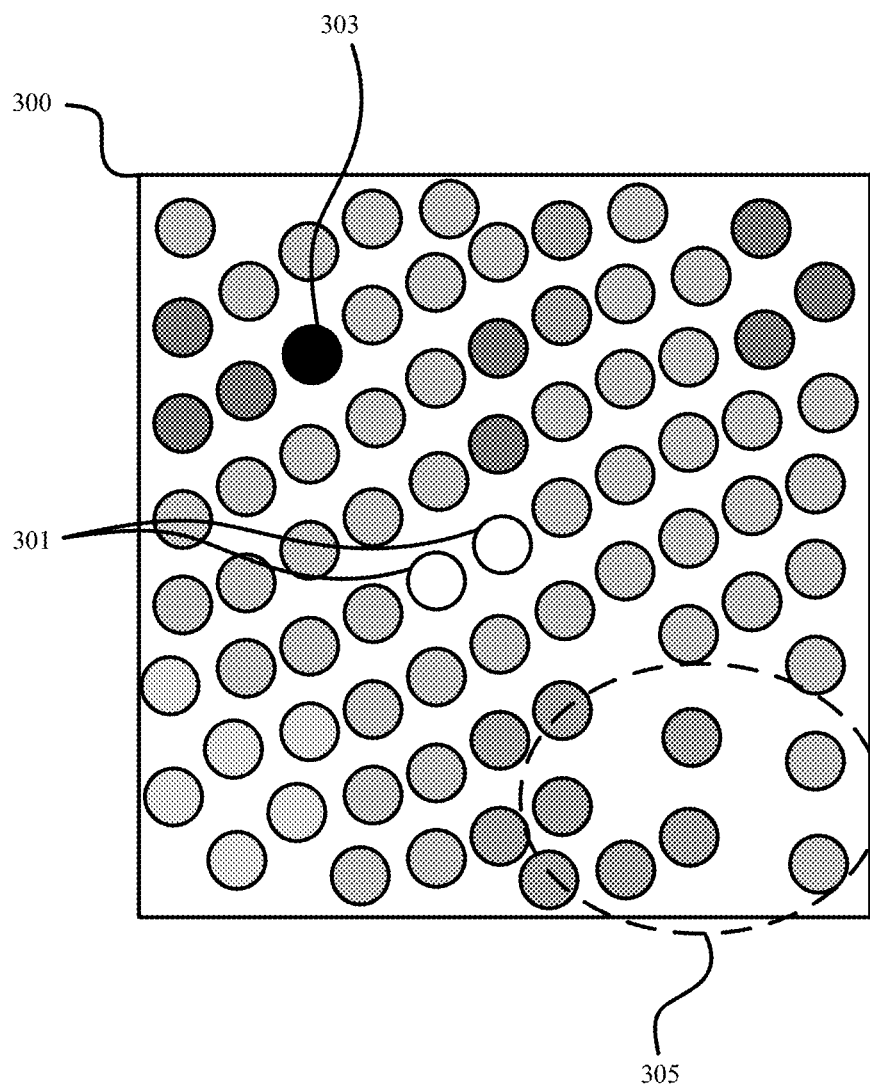
FIG. 3 illustrates examples of different gaps amongst pixels generated for a viewport in accordance with some embodiments presented herein.

FIG. 3 illustrates examples of different gaps 301, 303, and 305 amongst pixels generated for viewport 300 in accordance with some embodiments presented herein. Each gap 301, 303, and 305 represents one or more pixels within the set of pixels generated for viewport 300 that contain incorrect, inaccurate, and/or invalid values and that degrade the overall quality of the image that is rendered from the set of pixels in viewport 300.

First gap 301 occurs in viewport 300 when the color values of one or more pixels correspond to color values that are generated by a malfunctioning or inoperable photosite of an imaging sensor. For instance, one or more pixels that have a pure white coloring (e.g., RGB values of 255, 255, and 255) or a pure black coloring (e.g., RGB values of 0, 0, and 0) are representative of a default value that the imaging sensor or image encoder attributes to a position within a captured image when the imaging sensor or image encoder is unable to read values from the one or more photosites of the imaging sensor used to measure color or light intensity values at that position, or when the one or more photosites are malfunctioning and do not produce any measurements.

Second gap 303 occurs in viewport 300 when the colors values of one or more pixels deviate by more than a threshold amount from surrounding pixels. For instance, the surrounding pixels may have RGB color values that are within a particular range of RGB color values or that vary from a neighboring pixel by no more than a particular amount, and second gap 303 may include one or more pixels with RGB color values that are not within the particular range of RGB color values or that vary from a neighboring pixel by more than the particular amount.

Second gap 303 may occur when there is an obstruction that prevents the imaging sensor from directly imaging the desired object or when environmental conditions interfere with the image capture. For instance, shadows, reflections, dust, and/or other environmental conditions may result in an inaccurate imaging of the region represented by the pixels of second gap 303.

Third gap 305 occurs when there is insufficient data or missing pixels for a region of the rendered image. As shown in FIG. 3, third gap 305 results from the spacing, positioning, and/or density between two or more neighboring pixels being greater than a threshold amount.

In some embodiments, third gap 305 occurs in response to changing the virtual camera position, the field-of-view, and/or viewport 300 to render the image data from a zoomed in position or from an off-angle position. In some embodiments, third gap 305 occurs in response to the image file containing a non-uniform distribution of image data and/or the image data being captured with different densities at different regions of the image.

Figure 4:
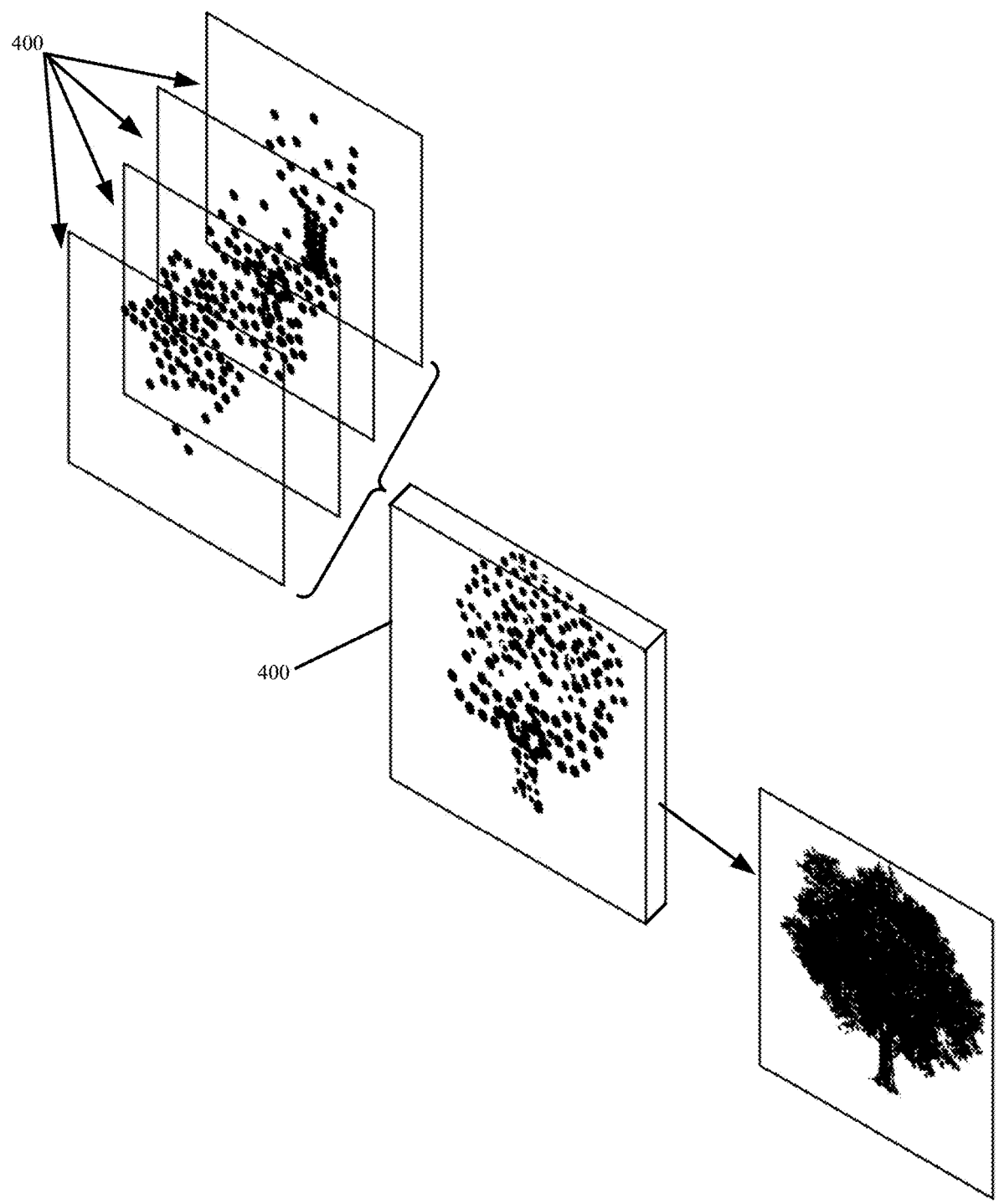
FIG. 4 illustrates an example of a point cloud in accordance with some embodiments presented herein.

A point cloud may be an example of a 3D image file with a non-uniform capture and/or distribution of image data. FIG. 4 illustrates an example of a point cloud 400 in accordance with some embodiments presented herein. In some embodiments, point cloud 400 may be generated using one or more of a 3D or depth-sensing camera, a structured light or patterned light imaging device, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, and/or other imaging equipment for 3D objects, volumetric objects, or 3D environments.

The data points that represent the image data of point cloud 400 may differ from pixels of a two-dimensional ("2D") image, because certain regions of point cloud 400 may have no data points, lower densities of data points, and/or higher densities of data points based on varying amounts of visual information that is detected or scanned at those regions. Additionally, the position of the point cloud data points may be defined in 3D space using x, y, and z coordinate values. In contrast, pixels of a 2D image are defined in 2D space and have a uniform density or fixed arrangement that is defined by the resolution of the 2D image. In other words, the point cloud data points may have a non-uniform placement or positioning, whereas the 2D image may have pixel data for each pixel of a defined resolution (e.g., 640×480, 800×600, etc.).

Each point cloud data point may be defined with a plurality of elements. The plurality of elements may include a first set of positional elements, and a second set of non-positional or descriptive elements.

The positional elements may include coordinates within 3D space. For instance, each point cloud data point may include x-coordinate, y-coordinate, and z-coordinate elements to capture the position of a corresponding physical point from an imaged surface, feature, or article of the 3D object or the 3D environment in 3D space.

The non-positional elements may include information about the detected characteristics of the surface, feature, or article imaged at a corresponding position in 3D space. The characteristics may correspond to a detected color and/or intensity values measured across different visible and non-visible bands of the electromagnetic spectrum at the surface, feature, or article identified by the set of positional elements of the same data point. The color may be represented using RGB and/or other values. In some embodiments, a data point may have multiple sets of non-positional elements with each set of non-positional elements storing intensity values or other hyperspectral values detected across a different band of the electromagnetic spectrum.

In some embodiments, the non-positional elements may store other measured or derived characteristics including the chrominance, hardness, translucence, reflectivity, luminance, metallic characteristics, roughness, specular, diffuse, albedo, index of refraction ("IOR"), and/or other properties from the imaged surface, feature, or article position. In some embodiments, the non-positional elements may directly identify a material property or other classification for a data point. For instance, a first data point may be defined with a non-positional element with a value that identifies the material property of "aluminum", a second data point may be defined with a non-positional element with a value that identifies the material property of "steel", and a third data point may be defined with a non-positional element with a value that identifies the material property of "plastic".

Figure 5:
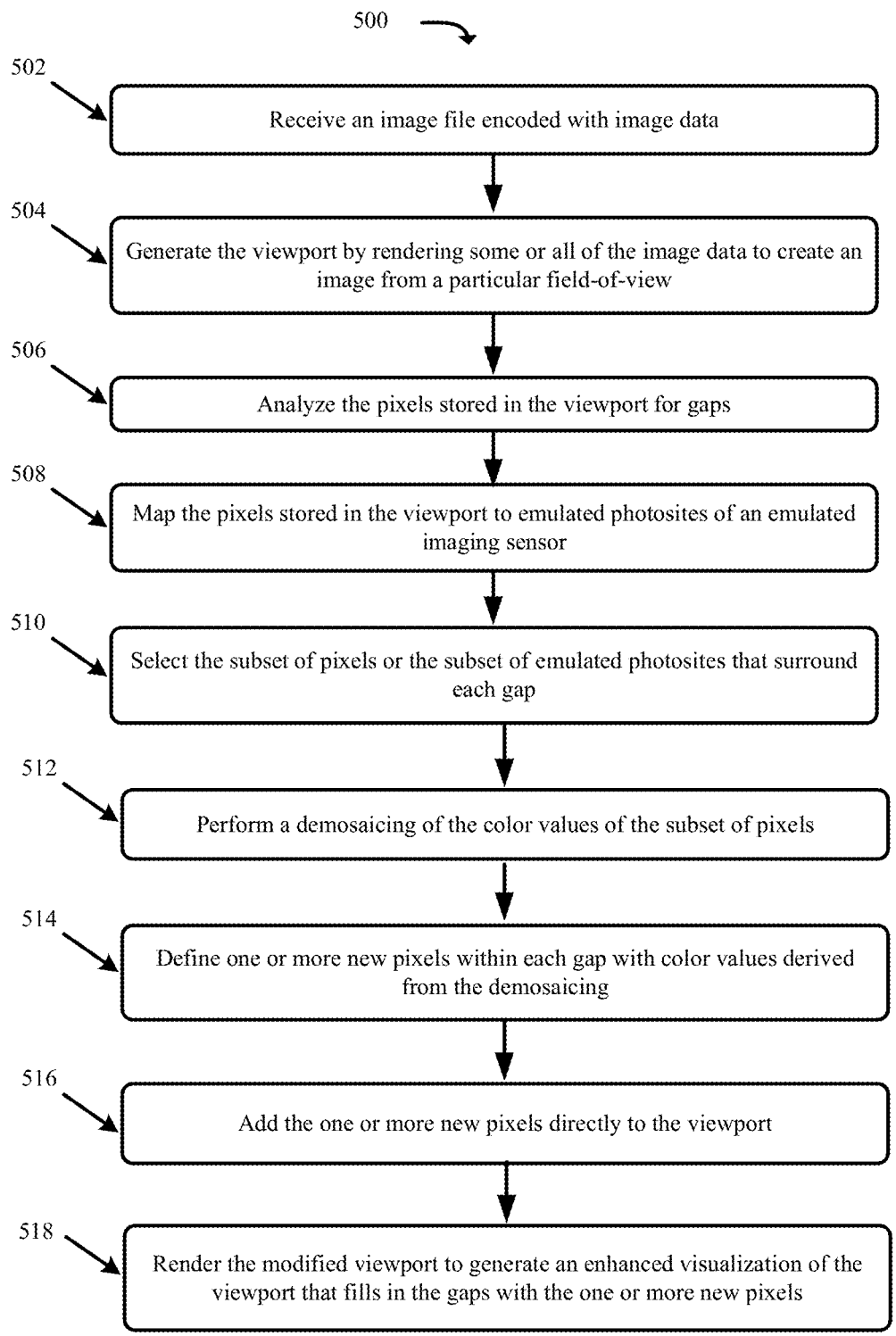
FIG. 5 presents a process for postprocessing a rendered image via a demosaicing of the viewport in accordance with some embodiments presented herein.

FIG. 5 presents a process 500 for postprocessing a rendered image via a demosaicing of the viewport in accordance with some embodiments presented herein. Process 500 is implemented by image postprocessor 100. Specifically, image postprocessor 100 implements process 500 as part of an image rendering pipeline or using the output of the image rendering pipeline. Process 500 is performed to improve the quality of images rendered by the image rendering pipeline. Image postprocessor 100 uses the same or different processing cores of the GPU or other hardware processors as the image rendering pipeline to perform the image postprocessing.

Process 500 includes receiving (at 502) an image file encoded with image data. In some embodiments, the image file is created by an imaging device (e.g., a camera), and the image data is encoded as raw mosaic values measured by different photosites of the imaging device or intensity returns measured for different spectral bands of the electromagnetic spectrum. In some other embodiments, the image data within the image file is encoded as a set of pixels with each pixel having a set of color values. The image file may be a 2D file or a 3D file. For instance, the received (at 502) image file may be a point cloud with data points that are non-uniformly distributed in 3D space in order to represent the precise positions and descriptive characteristics (e.g., hyperspectral data) of different scanned points from objects within a 3D environment.

Process 500 includes generating (at 504) the viewport by rendering some or all of the image data to create an image from a particular field-of-view. The particular field-of-view may include the entirety of the image, a portion of the image, and/or a modified portion of the image (e.g., a zoomed in region, a region modified with one or more edits, etc.).

Generating (at 504) the viewport includes identifying the image data that falls within the particular field-of-view, generating the pixels for the visualization of the particular-field-view, and entering the pixels for the visualization of the particular field-of-view into a memory buffer from which onscreen images are displayed (e.g., a frame buffer). In some embodiments, generating the pixels for the visualization includes selecting some or all pixels defined as the image data from the image file that are within the particular field-of-view. In some other embodiments, generating the pixels for the visualization includes converting raw mosaic values, hyperspectral data (e.g., data measured across different bands of the electromagnetic spectrum) and/or other image data that are not in a pixel format and that span the particular field-of-view into pixels with color values that may be presented on a display. For instance, generating the pixels may include converting intensity values measured in a first near-infrared band to a range of red color values, converting intensity values measured in a second far-infrared band to a range of blue color values, and converting intensity values measured in a third ultraviolet band to a range of green color values.

Process 500 includes analyzing (at 506) the pixels stored in the viewport for gaps. Image postprocessor 100 detects the gaps based on the positioning or spacing between the viewport pixels, the density of the viewport pixels generated for the visualization of the particular field-of-view, and/or differences in the viewport pixel color values. Specifically, image postprocessor 100 analyzes (at 506) the pixels to identify subsets of pixels that contain dissimilar or anomalous values that are incongruent with other surrounding pixels.

Process 500 includes mapping (at 508) the pixels stored in the viewport to emulated photosites of an emulated imaging sensor. Depending on the viewport resolution, each pixel or a subset of pixels that make up the viewport may be mapped (at 508) as a different emulated photosite. In some embodiments, the individual RGB color components of each pixel or a subset of pixels may be mapped (at 508) as a different emulated photosite and may also be converted back to a different hyperspectral intensity measurement. The mapping (at 508) includes arranging the emulated photosites according to the positioning of the viewport pixels. For instance, a viewport comprised of a 640×480 arrangement of pixels may be directly mapped to a 640×480 arrangement of emulated photosites.

Process 500 includes selecting (at 510) the subset of pixels or the subset of emulated photosites that surround each gap. Image postprocessor 100 detects the position of each gap in the viewport and/or within the set of pixels forming the viewport, and selects (at 510) the subset of pixels that neighbor the gap from multiple sides. In some embodiments, image postprocessor 100 selects (at 510) the closest neighboring pixels on every side of the gap. In some other embodiments, image postprocessor 100 includes pixels that surround the gap and that are one or more pixels removed from the pixels associated with the gap to increase the number of pixels within the selected (at 510) subset of pixels and to contain additional image data for performing the demosaicing.

Process 500 includes performing (at 512) a demosaicing of the color values of the subset of pixels, and defining (at 514) one or more new pixels within each gap with color values derived from the demosaicing. In some embodiments, performing (at 512) the demosaicing includes averaging the color values and/or original intensity values captured in the different hyperspectral bands and that are represented by the color values of the selected (at 510) subset of pixels that surround the gap to define (at 514) the one or more new pixels. In some other embodiments, performing (at 512) the demosaicing includes performing a weighted averaging of the color values from the selected (at 510) subset of pixels based on the distance of each pixel in the subset of pixels to the position of the gap or each of the newly defined (at 514) one or more pixels. In still some other embodiments, image postprocessor 100 defines (at 514) the color values for the one or more new pixels using other formulas, techniques, and/or computations that are applied to the color values of the selected (at 510) subset of pixels.

Process 500 includes adding (at 516) the one or more new pixels directly to the viewport. For instance, image postprocessor 100 enters the one or more new pixels into the memory buffer from which the viewport is rendered.

Process 500 includes rendering (at 518) the modified viewport (e.g., the modified memory buffer storing the pixels of the viewport) to generate a new enhanced visualization of the viewport that fills in the gaps with the one or more new pixels. In this manner, image postprocessor 100 dynamically improves the visualization quality and/or level of detail within the viewport without editing the image data or the image file. Image postprocessor 100 renders the original image data, detects gaps in the image data based on the color values from the pixels that are rendered from the original image data, and improves upon the rendered visualization by replacing the gaps with pixels that are interpolated based on the color values of neighboring pixels.

In some embodiments, image postprocessor 100 uses one or more artificial intelligence and/or machine learning ("AI/ML") techniques to improve the gap detection. Specifically, image postprocessor 100 uses the AI/ML techniques to differentiate between a first set of pixels with color values that correctly deviate from the color values of neighboring pixels, and a second set of pixels with color values that incorrectly deviate from the color values of neighboring pixels. The AI/ML techniques identify the first set of pixels as correctly representing a part of the overall image, and identify the second set of pixels as representing a gap that incorrectly represents another part of the overall image. In other words, both sets of pixels may have color values that deviate from the color values of surrounding pixels by more than a threshold amount. However, the AI/ML techniques perform a secondary analysis using criteria besides the color values to determine if the deviation is valid and part of the image or if the deviation is unintentional and a result of an improper image capture or corrupted image data.

Figure 6:
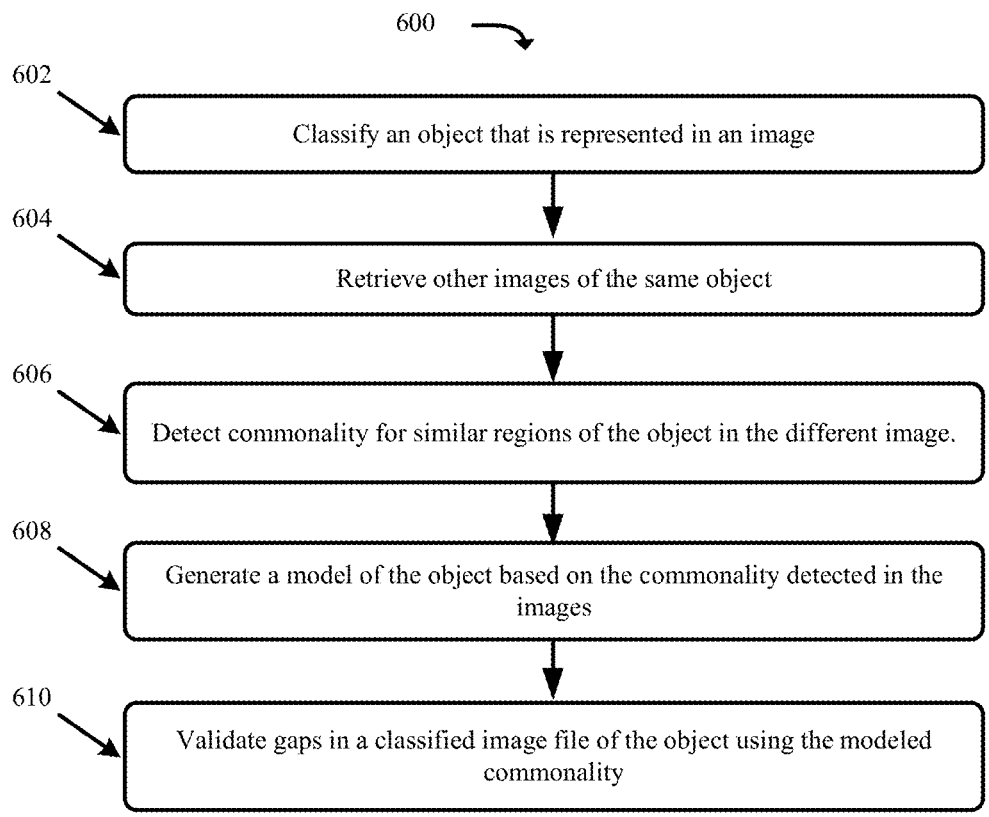
FIG. 6 presents a process for generating the AI/ML models that improve the gap detection accuracy in accordance with some embodiments presented herein.

FIG. 6 presents a process 600 for generating the AI/ML models that improve the gap detection accuracy in accordance with some embodiments presented herein. Process 600 is implemented by image postprocessor 100 using one or more neural networks, pattern recognition techniques, and/or other AI/ML techniques.

Process 600 includes classifying (at 602) an object that is represented in an image and that is captured in other images on which the image postprocessing is to be applied. A user may input the classification, or the AI/ML techniques may autonomously classify (at 602) the object represented in the image by performing image recognition, image comparison, and/or image analysis.

Process 600 includes retrieving (at 604) or looking up other images of the same object. For instance, image postprocessor 100 may perform a web search using the classification label to obtain the additional reference images, or may search an image database based on the classification label.

Process 600 includes detecting (at 606) commonality for similar regions of the object in the different images. For instance, image postprocessor 100 analyzes the images to detect (at 606) a first set of regions across the object that have consistent or similar color values in a disproportionate percentage of the images, and to detect (at 606) a second set of regions across the object where the color values deviate in a disproportionate percentage of the image. In some embodiments, the commonality is detected (at 606) by aligning and comparing the different images of the object, and by performing pattern matching or image analysis.

Process 600 includes generating (at 608) a model of the object based on the commonality detected (at 606) in the images. For instance, image postprocessor 100, using the one or more AI/ML techniques, defines the model so that deviations occurring in the first set of regions are flagged as gaps and deviations occurring in the second set of regions are accepted as intentional variations in the imaging of the object.

Process 600 includes validating (at 610) gaps in a classified image file of the object using the modeled commonality. Validating (at 610) the gaps includes detecting regions in the classified image file that contain color values that deviate from surrounding pixels by more than a threshold amount, and determining if those regions are defined in the generated (at 608) model to contain dissimilar or deviating values and therefore should be classified as gaps, or are defined in the generated (at 608) model to contain similar and consistent values and therefore should be classified as gaps.

In some embodiments, image postprocessor 100 may reference metadata and/or other data associated with each pixel to differentiate between gaps with pixels having invalid deviating color values from sets of pixels with color values that correctly deviate from the color values of neighboring pixels. Specifically, image postprocessor 100 may reference other non-positional values besides color values stored in a point cloud data point to determine if the one or more pixels generated from that point cloud data point are part of a gap in the image data or correctly deviate from surrounding pixels.

Figure 7:
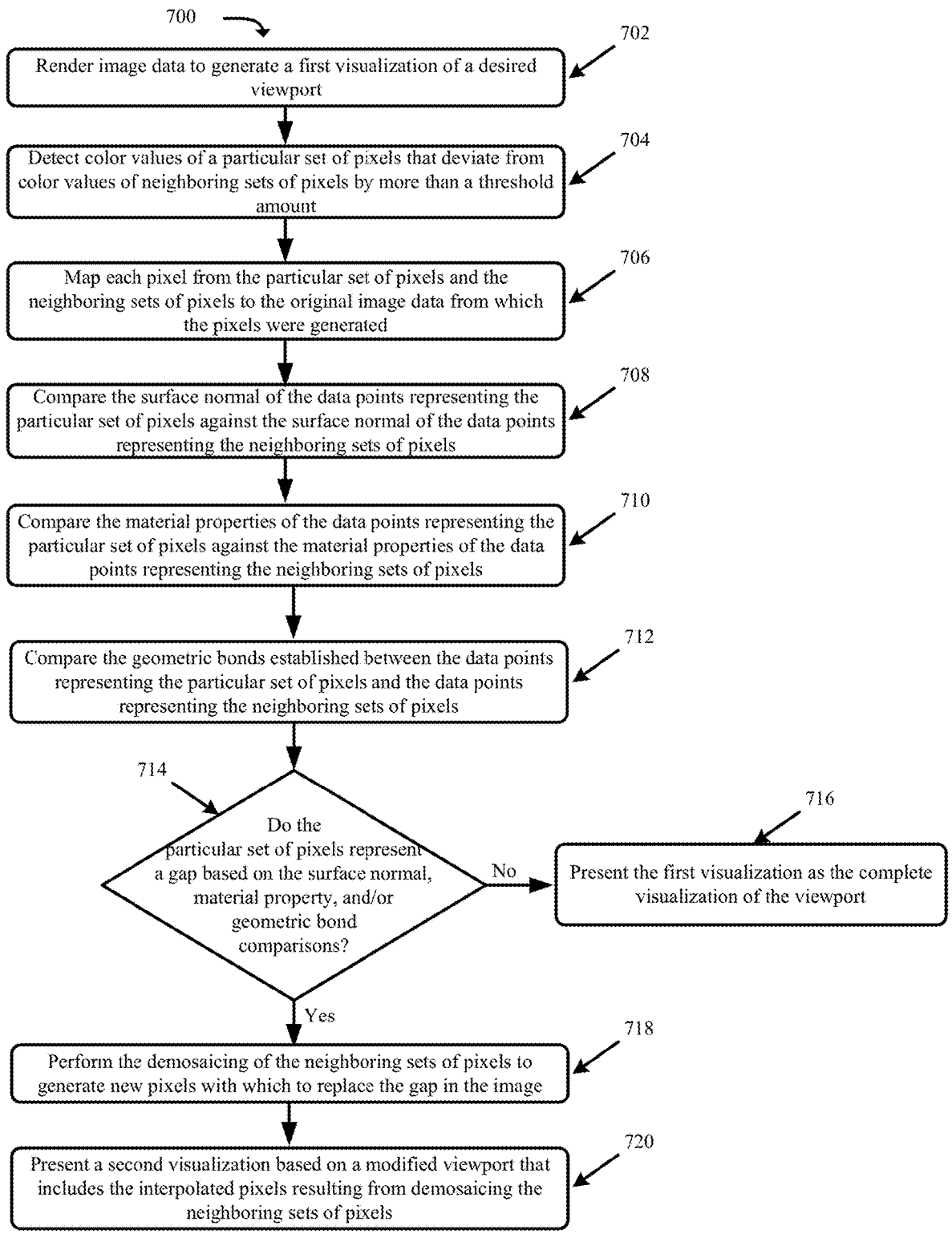
FIG. 7 presents a process for classifying deviations in color values of an image based on mapped point cloud non-positional elements in accordance with some embodiments presented herein.

FIG. 7 presents a process 700 for classifying deviations in color values of an image based on mapped point cloud non-positional elements in accordance with some embodiments presented herein. Process 700 is implemented by image postprocessor 100 as part of enhancing and postprocessing an image.

Process 700 includes rendering (at 702) image data to generate a first visualization of a desired viewport. Rendering (at 702) the image data may include converting intensity measurements captured for each data point across different hyperspectral bands into a range of visible color values (e.g., RGB values)

Process 700 includes detecting (at 704) color values of a particular set of pixels that deviate from the color values of neighboring sets of pixels by more than a threshold amount. The deviation may include an abrupt change in color values in which the color values change by more than the threshold amount from the particular set of pixels to the neighboring sets of pixels, missing color values, and/or other anomalies in the color values of the particular set of pixels relative to the color values of the neighboring sets of pixels (e.g., incorrectly converted hyperspectral data or hyperspectral data that is out of range of the converted color values).

Process 700 includes mapping (at 706) each pixel from the particular set of pixels and the neighboring sets of pixels to the original image data from which the pixels were generated. In some embodiments, the mapping (at 706) includes tracing a rendered pixel to the one or more data points from a point cloud that contained the image data used in generating that rendered pixel. In some such embodiments, the mapping (at 706) further includes converting the color values of the rendered pixels back to the original intensity values and/or other hyperspectral data that was captured for the data points represented by those pixels. Image postprocessor 100 may perform the mapping (at 706) based on the position of the rendered pixel within the viewport aligning with the position of the one or more data points in a defined point cloud field-of-view. For instance, image postprocessor 100 may determine the view frustum from which the point cloud is rendered based on the position of a virtual camera in the 3D space of the point cloud, may determine the set of point cloud data points that fall within the view frustum or the field-of-view of the virtual camera, and may determine the one or more data points at the positions in the view frustum that correspond to the positions of different pixels rendered as part of the viewport or first visualization.

The mapping (at 706) also provides image postprocessor 100 with additional values besides color values that may be used to determine similarities or differences between the sets of pixels and/or if the deviating color values correctly represent the imaged object or were incorrectly captured as a result of one or more issues affecting the imaging of the object. For instance, the non-positional elements of a point cloud data point store the surface normal of the captured data point, material property associated with the data point, geometric bonds established between the data points, and/or other values in addition to color values of the data point.

Accordingly, process 700 includes comparing (at 708) the surface normal of the data points representing the particular set of pixels against the surface normal of the data points representing the neighboring sets of pixels. The surface normal comparison (at 708) reveals if the data points for the particular set of pixels and the neighboring set of pixels belong to the same surface. If the surface normal of the different data points are the same or follow a particular pattern or curvature, then image postprocessor 100 may determine that the data points producing the particular set of pixels correctly captured part of the same surface as the data points producing the neighboring sets of pixels. Conversely, if the surface normal of the data points producing the particular set of pixels vary significantly (e.g., vary by more than 45 degrees) from the surface normal of the data points producing the neighboring sets of pixels, image postprocessor 100 may determine that the particular set of pixels were inaccurately captured or represent a gap in the image.

Process 700 includes comparing (at 710) the material properties of the data points representing the particular set of pixels against the material properties of the data points representing the neighboring sets of pixels. The material properties identify the object that was captured by the data points, and if the material properties are the same or similar, then image postprocessor 100 may determine that the data points producing the particular set of pixels are part of the same surface or object as the data points producing the neighboring sets of pixels. Conversely, if the material properties differ, image postprocessor 100 may determine that the particular set of pixels were inaccurately captured or represent a gap in the image.

Process 700 includes comparing (at 712) the geometric bonds established between the data points representing the particular set of pixels and the data points representing the neighboring sets of pixels. The geometric bonds specify the structure or arrangement of the object represented by the data points. If the structure or arrangement remains similar across the data points representing the particular set of pixels and the data points representing the neighboring sets of pixels, then image postprocessor 100 may determine that the data points producing the particular set of pixels were accurately captured and represent the same object as the data points producing the neighboring sets of pixels.

Process 700 includes determining (at 714) whether the particular set of pixels represent a gap in the first visualization based on the surface normal, material property, and/or geometric bond comparisons. In response to determining (at 714— No) that the particular set of pixels do not represent a gap in the first visualization based on the surface normal, material property, and/or geometric bonds of the data points producing the particular set of pixels being similar or within specified thresholds of the surface normal, material property, and/or geometric bonds for the data points producing the neighboring sets of pixels, process 700 includes presenting (at 716) the first visualization as the complete visualization of the viewport. In response to determining (at 714— Yes) that the particular set of pixels represent a gap in the first visualization, process 700 includes performing (at 718) the demosaicing of the neighboring sets of pixels to generate new pixels with which to replace the gap in the image, and presenting (at 720) a second visualization based on a modified viewport that includes the interpolated pixels resulting from demosaicing the neighboring sets of pixels.

The mapping (at 706) of pixels back to the point cloud data points that were used to generated those pixels and the various comparisons besides the pixel color values may become a computationally expensive process. Accordingly, in some embodiments, image postprocessor 100 selectively performs the mapping and surface normal, material property, geometric bond, and/or other data point non-positional element comparisons based on resources and/or computational power of the device rendering the image data or the size and/or resolution of the display that presents the rendered image.

For instance, the gaps in an image presented on a small sized display (e.g., smaller than 6 inches) may be difficult to discern with the human eye, whereas the same gaps on a much larger display (e.g., greater than 30 inches) may be easier to discern and may be more noticeable. Moreover, the device with a small sized display is likely to have fewer computational or rendering resources than a device with a larger display. Accordingly, image postprocessor 100 may retain the gaps or perform the gap correction based on the pixel color value deviations for the small screen sizes and underpowered devices, and may perform the gap correction based on the AI/ML model validations and/or mapped data point non-positional elements for the large screen sizes and more power devices (e.g., a desktop computer with several gigabytes of memory and one or more GPUs performing the rendering).

Figure 8:
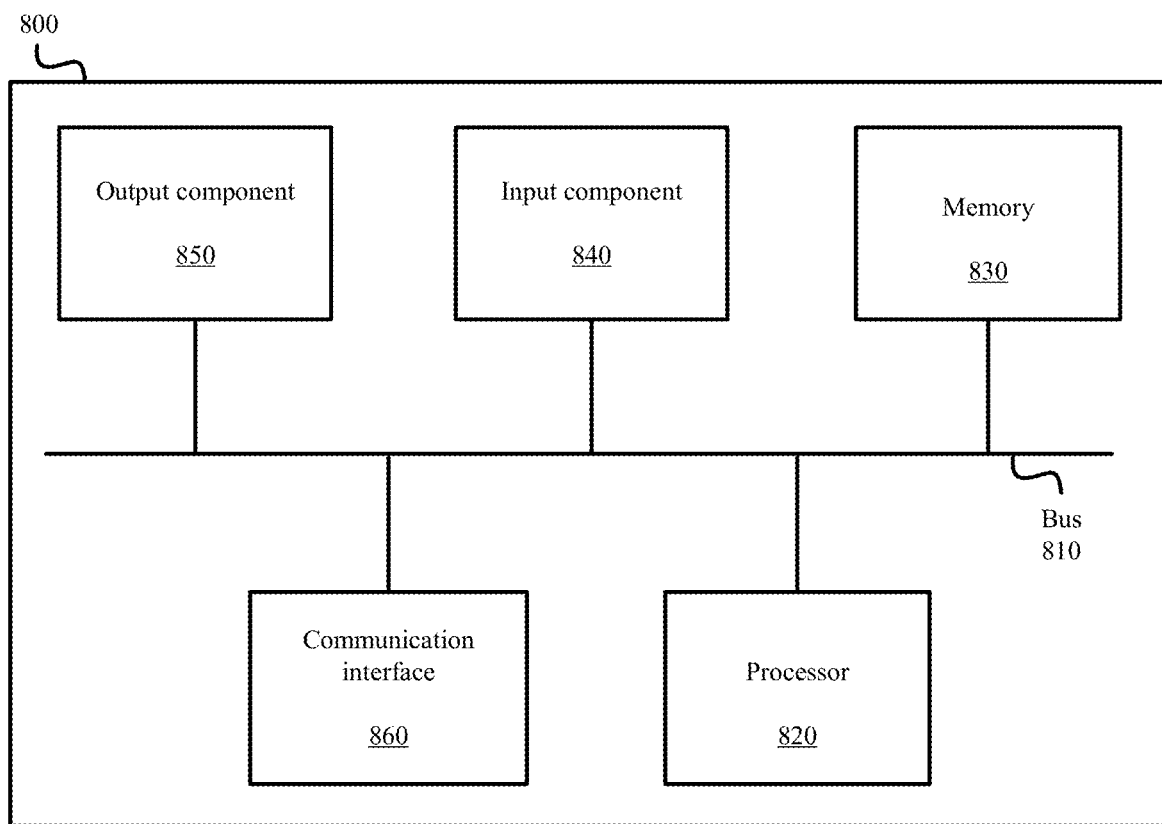
FIG. 8 illustrates example components of one or more devices, according to one or more embodiments described herein.

FIG. 8 is a diagram of example components of device 800. Device 800 may be used to implement one or more of the devices or systems described above (e.g., image postprocessor 100, rendering system, etc.). Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more LEDs, etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   determining a field-of-view from which to render image data stored in an image file;
   defining a viewport comprising a set of pixels that collectively produce a first visualization of the field-of-view from the image data in the image file;
   detecting a gap in the viewport, wherein the gap comprises a first subset of pixels from the set of pixels with color values that deviate by more than a threshold amount from color values of a second subset of pixels from the set of pixels that surround the first subset of pixels;
   mapping the set of pixels to a set of emulated photosites of an emulated imaging sensor based on a position of each pixel from the set of pixels in the viewport;
   demosaicing color values associated with a subset of emulated photosites from the set of emulated photosites, wherein the color values associated with the subset of emulated photosites map to the color values of the second subset of pixels, and wherein demosaicing the color values associated with the subset of emulated photosites comprises generating one or more new pixels for the gap with color values that are different than the color values of the first subset of pixels;
   replacing the first subset of pixels in the viewport with the one or more new pixels; and
   presenting a second visualization of the field-of-view from rendering the viewport after replacing the first subset of pixels with the one or more new pixels.

2. The method of claim 1 further comprising:
   entering the set of pixels in a memory buffer that stores pixels defined for the viewport.

3. The method of claim 2, wherein replacing the first subset of pixels comprises:
   modifying pixels stored in one or more of the viewport and the memory buffer without modifying the image data of the image file.

4. The method of claim 1 further comprising:
   presenting the first visualization from rendering the set of pixels; and
   wherein presenting the second visualization comprises:
      enhancing the first visualization by replacing a region within the first visualization that is rendered from the color values of the first subset of pixels with a region that is rendered from the color values of the one or more new pixels.

5. The method of claim 1, wherein generating the one or more new pixels comprises:
   interpolating the color values of the one or more new pixels from the color values of the second sub set of pixels.

6. The method of claim 1, wherein detecting the gap comprises:

comparing the color values of the first subset of pixels against the color values of the second subset of pixels that surround the first subset of pixels; and determining that the color values of the first subset of pixels differ by more than the threshold amount from the color values of the second subset of pixels.

7. The method of claim 1, wherein defining the viewport comprises:

converting the image data from a first format to the set of pixels with the color values of the set of pixels being defined in a second format that is different than the first format.

8. The method of claim 1 further comprising:

classifying an object that is represented by the image data of the image file;

obtaining a plurality of different images of the object;

modeling a first set of regions of the object having common color values in the plurality of different images, and a second set of regions of the object having varying color values in the plurality of different images; and validating the gap as containing invalid color values based on the gap corresponding to a region in the first set of regions and the color values of the first subset of pixels forming the gap differing from the common color values of the first set of regions by more than the threshold amount.

9. The method of claim 8 further comprising:

detecting a second gap in the viewport, wherein the second gap comprises a third subset of pixels from the set of pixels with color values that deviate by more than the threshold amount from color values of a fourth subset of pixels from the set of pixels that surround the third subset of pixels;

validating the second gap as containing valid color values based on the second gap corresponding to a particular region in the second set of regions and the color values of the third subset of pixels forming the second gap being consistent with the varying color values in the second set of regions; and wherein presenting the second visualization comprises rendering the third subset of pixels and the fourth subset of pixels as part of the second visualization.

10. A system comprising:

one or more hardware processors configured to:

determine a field-of-view from which to render image data stored in an image file;

define a viewport comprising a set of pixels that collectively produce a first visualization of the field-of-view from the image data in the image file;

detect a gap in the viewport, wherein the gap comprises a first subset of pixels from the set of pixels with color values that deviate by more than a threshold amount from color values of a second subset of pixels from the set of pixels that surround the first subset of pixels;

map the set of pixels to a set of emulated photosites of an emulated imaging sensor based on a position of each pixel from the set of pixels in the viewport;

demosaic color values associated with a subset of emulated photosites from the set of emulated photosites, wherein the color values associated with the subset of emulated photosites map to the color values of the second subset of pixels, and wherein demosaicing the color values associated with the subset of emulated photosites comprises generating one or more new pixels for the gap with color values that are different than the color values of the first subset of pixels;

replace the first subset of pixels in the viewport with the one or more new pixels; and present a second visualization of the field-of-view from rendering the viewport after replacing the first subset of pixels with the one or more new pixels.

11. The system of claim 10, wherein the one or more hardware processors are further configured to:

enter the set of pixels in a memory buffer that stores pixels defined for the viewport.

12. The system of claim 11, wherein replacing the first subset of pixels comprises:

modifying pixels stored in one or more of the viewport and the memory buffer without modifying the image data of the image file.

13. The system of claim 10, wherein the one or more hardware processors are further configured to:

present the first visualization from rendering the set of pixels; and wherein presenting the second visualization comprises:

enhancing the first visualization by replacing a region within the first visualization that is rendered from the color values of the first subset of pixels with a region that is rendered from the color values of the one or more new pixels.

14. The system of claim 10, wherein generating the one or more new pixels comprises:

interpolating the color values of the one or more new pixels from the color values of the second sub set of pixels.

15. The system of claim 10, wherein detecting the gap comprises:

comparing the color values of the first subset of pixels against the color values of the second subset of pixels that surround the first subset of pixels; and determining that the color values of the first subset of pixels differ by more than the threshold amount from the color values of the second subset of pixels.

16. The system of claim 10, wherein defining the viewport comprises:

converting the image data from a first format to the set of pixels with the color values of the set of pixels being defined in a second format that is different than the first format.

17. The system of claim 10, wherein the one or more hardware processors are further configured to:

classify an object that is represented by the image data of the image file;

obtain a plurality of different images of the object;

model a first set of regions of the object having common color values in the plurality of different images, and a second set of regions of the object having varying color values in the plurality of different images; and validate the gap as containing invalid color values based on the gap corresponding to a region in the first set of regions and the color values of the first subset of pixels forming the gap differing from the common color values of the first set of regions by more than the threshold amount.

18. The system of claim 17, wherein the one or more hardware processors are further configured to:

detect a second gap in the viewport, wherein the second gap comprises a third subset of pixels from the set of pixels with color values that deviate by more than the threshold amount from color values of a fourth subset of pixels from the set of pixels that surround the third subset of pixels;

validate the second gap as containing valid color values based on the second gap corresponding to a particular region in the second set of regions and the color values of the third subset of pixels forming the second gap being consistent with the varying color values in the second set of regions; and wherein presenting the second visualization comprises rendering the third subset of pixels and the fourth subset of pixels as part of the second visualization.

19. A non-transitory computer-readable medium storing program instructions that, when executed by one or more hardware processors, cause a computing system to perform operations comprising:

determine a field-of-view from which to render image data stored in an image file;

define a viewport comprising a set of pixels that collectively produce a first visualization of the field-of-view from the image data in the image file;

detect a gap in the viewport, wherein the gap comprises a first subset of pixels from the set of pixels with color values that deviate by more than a threshold amount from color values of a second subset of pixels from the set of pixels that surround the first subset of pixels;

map the set of pixels to a set of emulated photosites of an emulated imaging sensor based on a position of each pixel from the set of pixels in the viewport;

demosaic color values associated with a subset of emulated photosites from the set of emulated photosites, wherein the color values associated with the subset of emulated photosites map to the color values of the second subset of pixels, and wherein demosaicing the color values associated with the subset of emulated photosites comprises generating one or more new pixels for the gap with color values that are different than the color values of the first subset of pixels;

replace the first subset of pixels in the viewport with the one or more new pixels; and present a second visualization of the field-of-view from rendering the viewport after replacing the first subset of pixels with the one or more new pixel.

* * * * *